(12) United States Patent
Cho

(10) Patent No.: US 12,319,269 B2
(45) Date of Patent: Jun. 3, 2025

(54) HYBRID VEHICLE AND METHOD OF SUPPORTING AUDIO INPUT/OUTPUT FOR THE SAME

(71) Applicants: Hyundai Motor Company, Seoul (KR); Kia Corporation, Seoul (KR)

(72) Inventor: Jin Kyeom Cho, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 348 days.

(21) Appl. No.: 17/890,623

(22) Filed: Aug. 18, 2022

(65) Prior Publication Data
US 2023/0211771 A1    Jul. 6, 2023

(30) Foreign Application Priority Data
Dec. 31, 2021 (KR) .................. 10-2021-0194669

(51) Int. Cl.
| | |
|---|---|
| *B60W 20/17* | (2016.01) |
| *B60W 10/06* | (2006.01) |
| *B60W 10/08* | (2006.01) |
| *B60W 20/40* | (2016.01) |
| *B60W 50/14* | (2020.01) |

(52) U.S. Cl.
CPC ............ *B60W 20/17* (2016.01); *B60W 10/06* (2013.01); *B60W 10/08* (2013.01); *B60W 20/40* (2013.01); *B60W 50/14* (2013.01); *B60W 2050/146* (2013.01); *B60W 2540/21* (2020.02)

(58) Field of Classification Search
CPC ...... B60W 20/17; B60W 10/06; B60W 10/08; B60W 20/40; B60W 50/14; B60W 2540/21; B60W 2050/146
See application file for complete search history.

(56) References Cited

U.S. PATENT DOCUMENTS

| | | | |
|---|---|---|---|
| 10,363,918 | B2 | 7/2019 | Kim et al. |
| 2018/0222384 | A1* | 8/2018 | Dudar ................ B60Q 5/008 |
| 2020/0231138 | A1* | 7/2020 | Burkholz ............ B60W 10/30 |
| 2023/0174046 | A1* | 6/2023 | Cho .................... B60W 20/19 |
| | | | 701/22 |

FOREIGN PATENT DOCUMENTS

| | | | |
|---|---|---|---|
| JP | 2009-280139 A | 12/2009 | |
| JP | 2013-103513 A | 5/2013 | |

(Continued)

OTHER PUBLICATIONS

Feb. 28, 2023—Extended European Search Report—EP 22192597.7.

*Primary Examiner* — Hussein Elchanti
(74) *Attorney, Agent, or Firm* — Banner & Witcoff, Ltd.

(57) ABSTRACT

The present disclosure relates to a hybrid electric vehicle in which powertrain noise may be controlled to improve the voice command recognition performance of the vehicle control system and also improve the driver's experience with the audio guidance system, and a method for supporting audio input/output function for the same. A method of supporting audio input/output for a hybrid electric vehicle may include: determining a first condition for audio input/output function and a second condition for inside noise level; and performing a noise reduction control by inducing an engine-off state based on a current drive mode and further based on the first and the second conditions being satisfied.

16 Claims, 7 Drawing Sheets

(56) References Cited

FOREIGN PATENT DOCUMENTS

| | | |
|---|---|---|
| JP | 2014-94665 A | 5/2014 |
| JP | 5712895 B2 | 5/2015 |
| JP | 2019104444 A | 6/2019 |
| JP | 2019104462 A | 6/2019 |
| JP | 2019-119308 A | 7/2019 |

* cited by examiner

HYBRID VEHICLE AND METHOD OF SUPPORTING AUDIO INPUT/OUTPUT FOR THE SAME

This application claims the benefit of Korean Patent Application No. 10-2021-0194669, filed on Dec. 31, 2021, which is hereby incorporated by reference in its entirety.

BACKGROUND

Field

The present disclosure relates to a hybrid electric vehicle in which powertrain noise can be controlled such that voice command recognition of the vehicle control system is improved and also sound guidance therefrom is better recognized by a driver, and a method for supporting audio input/output function for the same.

Discussion of the Related Art

A voice input/output system in vehicles can improve the user experience of a driver. For example, a driver may set a destination by voice commands to an onboard navigation system, and turn-by-turn guides for pathfinding may be output by human-recorded or synthesized voice. However, while the vehicle is in motion, the recurring noise introduced by the powertrain, the tires, and surrounding environments may be introduced into the interior (e.g., inside) of the vehicle. Accordingly, due to the noise, the rate of recognition of a driver's voice command may be reduced, and also the driver may have difficulties recognizing the voice guidance emanating from the vehicle system. In general, inputting commands by voice may be better than manipulating physical buttons at preventing distractions while driving. However, a low recognition rate of the voice command may be even more distracting to the driver because the driver may need to repeatedly input voice commands and verify the results.

On the other hand, with rising interest in protecting the environment, the number of eco-friendly vehicles having an electric motor as a driving power source is also rising. Eco-friendly vehicles are also known as electrified vehicles, and their typical examples include electric vehicles (EVs) and hybrid electric vehicles (HEVs). When a hybrid electric vehicle runs in an EV mode, only its motor (e.g., electric motor) is used as its driving power source and thus the noise level may be rather low, however when the engine (e.g., an internal combustion engine) is operated for the driving power, the engine noise may leak into the cabin and the powertrain may become a hindrance to the recognition of voice input/output.

SUMMARY

An object of the present disclosure is to provide a hybrid electric vehicle able to effectively control noise when a voice-input/output related function is used, and a method for supporting audio input/output function for the same.

Additional objects, and features of the disclosure will be set forth in part in the description which follows and in part will become apparent to those having ordinary skill in the art upon examination of the following or may be learned from practice of the disclosure. The objects of the disclosure may be realized and attained by the structure particularly pointed out in the written description and claims hereof as well as the appended drawings.

According to a method, an apparatus, and a system, a hybrid electric vehicle may determine a first condition for audio input or output function, and a second condition for an interior noise level. Based on a determination that the first condition and the second condition are satisfied and further based on a current drive mode, the hybrid electric vehicle may perform a noise reduction control by inducing an engine-off state.

The first condition may include at least one of a start of an audio guidance output or a start of a voice command input.

The second condition may include the interior noise level being greater than a noise level threshold.

Performing of the noise reduction control may include, based on the current drive mode being an electric vehicle (EV) mode, inhibiting a transitioning to a hybrid electric vehicle (HEV) series mode, and/or raising a torque threshold for a mode transition.

Performing the noise reduction control may include, based on the current drive mode being an HEV mode, maintaining the HEV mode based on a torque requested by a driver being greater than a maximum torque for an EV mode; and d transitioning to the EV mode based on the torque requested by the driver being less than or equal to the maximum torque for the EV mode.

The hybrid electric vehicle may raise a torque threshold for a mode transition based on the first condition and the second condition being satisfied.

Performing the noise reduction control may include, based on the current drive mode being an HEV mode, determining whether engine noise is a dominant source of interior noise.

Performing the noise reduction control may further include transitioning to an EV mode, based on a determination that the engine noise is the dominant source of interior noise and a torque requested by a driver is less than or equal to a maximum torque for the EV mode.

Performing the noise reduction control may further include maintaining the HEV mode based on a determination that the engine noise is the dominant source of interior noise and a torque requested by a driver is greater than a maximum torque for the EV mode, and/or a determination that the engine noise is not the dominant source of interior noise.

Determining of whether the engine noise is the dominant source of interior noise may include accessing, using a current engine operating point, a table, which maps a plurality of engine operating points to respective engine-induced interior noise levels, to obtain an engine-induced interior noise level that corresponds to the current engine operating point; and comparing the engine-induced interior noise level with an interior noise level.

According to various embodiment of the present disclosure like described above, when an audio input/output (e.g., input or output) function used, recognition rate of voice command is improved and a driver is helped to better recognize guiding voice from the vehicle system, by controlling the powertrain to reduce the vehicle noise.

Additional advantages of the disclosure will be set forth in part in the description which follows and in part will become apparent to those having ordinary skill in the art upon examination of the following or may be learned from practice of the disclosure. Other advantages of the disclosure may be realized and attained by the structure particularly

DETAILED DESCRIPTION

Figure 1:
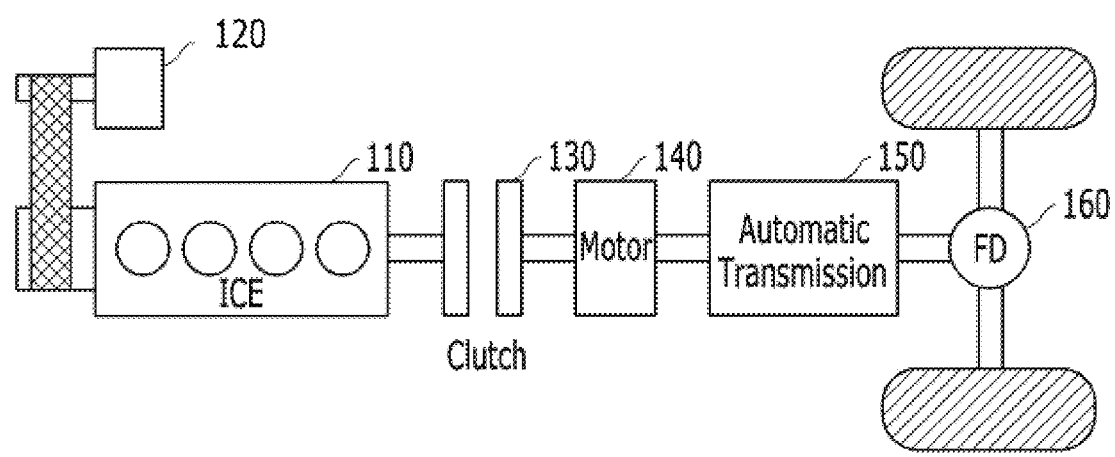
FIG. 1 represents an example of a conceptual structure of the powertrain of a hybrid electric vehicle.

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of related publicly known technology may obscure gist of the embodiments disclosed in the present specification, the detailed description thereof will be omitted. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Before describing a method of controlling a powertrain for supporting audio input/output according to an embodiment of the present disclosure, a structure and a control scheme of a hybrid electric vehicle will be described in advance.

FIG. 1 represents an example of a conceptual structure of the powertrain of a hybrid electric vehicle applicable to embodiments of the present disclosure.

In reference to FIG. 1, a powertrain of a parallel type hybrid electric vehicle having an electric (driving) motor 140 and an engine clutch 130 between the internal combustion engine (ICE) 110 and the transmission 150 is shown. Generally, in this type of vehicle, if a driver steps on the accelerator pedal (e.g., accelerator pedal sensor is on) after starting the engine, first, the motor 140 may be driven by using battery power with the engine clutch 130 open, and thus the wheels may be rotated by the driving power of the motor (140) via the transmission 150 and a final drive (FD) 160 (e.g., EV mode). Albeit not shown, instead of the final drive 160, the final drive 160 and a differential gear may be used.

If greater driving power is needed as the vehicle accelerates, an auxiliary motor (or a starter-generator motor 120) may be operated to drive the engine 110. Accordingly, when a difference in speed between the engine 110 and the motor 140 comes within a predetermined range (e.g., within a threshold value), the engine clutch 130 may be engaged and the engine 110 and the motor 140 may drive the vehicle together (e.g., transition from the EV mode to the HEV mode). If a predetermined condition for turning off the engine is satisfied, the engine clutch 130 may be disengaged and the engine 110 may stop (e.g., transition from the HEV mode to the EV mode). At this time, a battery (not shown) may be charged by the motor 140 using driving force of the wheels, which process is referred to as generating of brake energy or regenerative braking. Accordingly, since the starter-generator motor 120 serves as a starter motor when starting the engine 110 and as a generator to regenerate rotational energy of the engine 110 after the engine 110 starts or when the engine turns off, the starter-generator motor 120 may be also referred to as a hybrid starter generator (HSG) 120.

A multi-speed transmission or a transmission with a multi-plate clutch (e.g., a dual clutch transmission (DCT)) may be used for the transmission 150.

In the transition of a drive mode described herein, the HEV mode has been described as meaning HEV parallel mode in which the driving power of the engine 110 is transmitted to wheels. However, HEV series mode may be used. In the HEV series mode (also referred to as the HEV serial mode), the engine clutch 130 may be engaged and the driving power of the engine 110 need not be transmitted to the wheels, but used for battery charging by the HSG 120.

Figure 2:
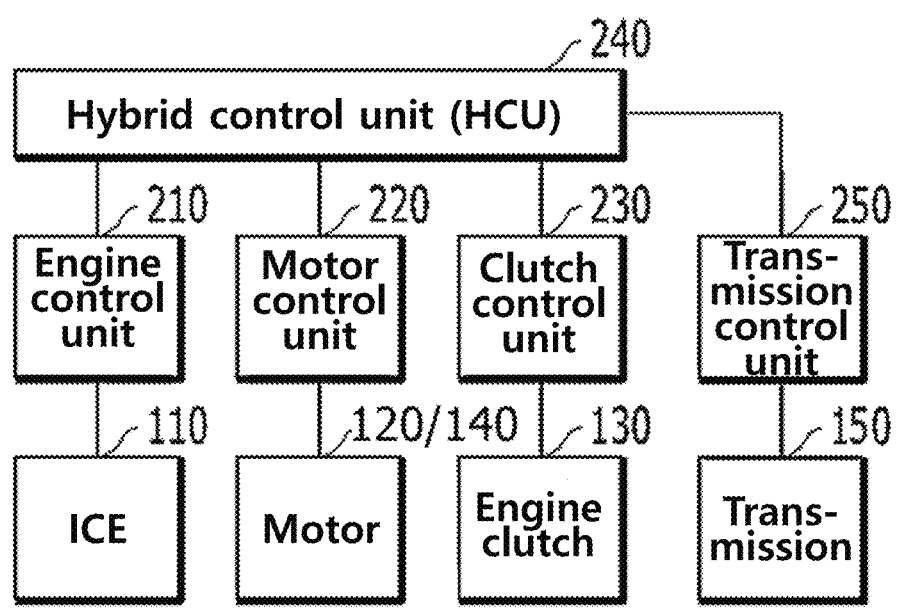
FIG. 2 represents an example of a control scheme for a hybrid electric vehicle.

FIG. 2 represents an example of a control scheme for a hybrid electric vehicle according to an embodiment of the present disclosure.

In reference to FIG. 2, in a hybrid electric vehicle to which embodiments of the present disclosure are applicable, the internal combustion engine 110 may be controlled by an engine control unit 210, the starter-generator motor 120 and the driving motor 140 by a motor control unit (MCU) 220 for their torques, and the engine clutch 130 by a clutch control unit 230, respectively. In here, the engine control unit 210 is also called an engine management system (EMS). Also, the transmission 150 is controlled by a transmission control unit 250.

Each control unit may be connected to a hybrid control unit (HCU) 240 which controls overall procedures for mode transitions as an upper (e.g., high-level) control unit thereof, and provide, according to a control thereof, information necessary for changing drive mode and controlling the engine clutch in shifting a gear, and/or information necessary for controlling an engine stop according or perform an action according to a control signal.

For example, the hybrid control unit 240 determines whether to change modes between EV and HEV or charge depleting (CD) and charge sustaining (CS) according to a driving state of the vehicle. To this end, the hybrid control unit may determine when to disengage the engine clutch 130 and perform fluid control for the disengagement. Also, the hybrid control unit 240 may determine the state (e.g., Lock-up, Slip, Open, etc.) of the engine clutch, and control when to stop injecting fuel into the engine 110. Also, the hybrid control unit may control regenerating of rotational energy of the engine by transmitting to the motor control unit 220 a torque command for controlling the torque of the starter-generator motor 120 to stop the engine. In addition, when controlling mode transition of drive modes, the hybrid control unit 240 may control lower control units for a determination of mode transition conditions and the transition.

The above-described relationship between the control units and the function/distinguishing of each control unit are only examples, and it is obvious to a person having ordinary skill in the art that the names act as no limitation thereupon. For example, the hybrid control unit 240 may be implemented to be replaced by any one of other control units which is made to further provide the function, or by two or more control units to which the function is distributed.

The term "unit" or "control unit" included in the names of a hybrid control unit (HCU), a motor control unit (MCU), etc. is merely a widely used term for naming a controller that controls a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto. A control unit may also be referred to as a controller.

FIGS. 1 and 2 and the corresponding description thereof are only examples of a hybrid electric vehicle, it is obvious to a person having ordinary skill in the art that a hybrid electric vehicle applicable to embodiments of the present disclosure is not limited thereto.

It is suggested, when voice command being input or audio guidance being output in a hybrid electric vehicle according to an embodiment of the present disclosure, to induce an engine-off state to reduce the noise occurred from the powertrain so that recognition rate of voice can be improved and audio guidance output from the vehicle system can be well recognized by a driver.

Figure 3:
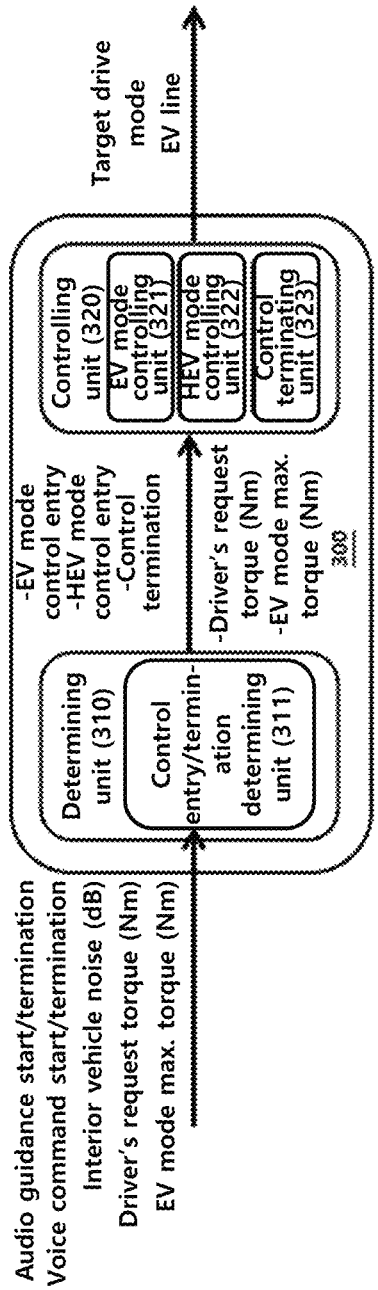
FIG. 3 represents an example of a conceptual structure of an audio input/output supporting control unit.

First, in reference to FIG. 3, a conceptual structure of an audio input/output supporting control unit which can perform control of a powertrain to support effective audio input/output according to an embodiment of the present disclosure is described.

FIG. 3 represents an example of a conceptual structure of an audio input/output supporting control unit according to an embodiment of the present disclosure.

In reference to FIG. 3, the audio input/output supporting control unit 300 may receive, as input information, information on a start and a termination of outputting audio guidance, information on a start and a termination of inputting voice command, information on interior (e.g., inside) vehicle noise, a driver's request torque (or requested power), and EV mode maximum torque (or maximum power). Also, the audio input/output supporting control unit 300 may output a target drive mode and EV mode transition threshold values according to vehicle speeds (also referred to as an EV line) as its output information.

The audio guidance may include information in a form of voice like voice navigation, but without being limited thereto. Of course, audio guidance, which is an entry condition for noise reduction control for a powertrain of an embodiment, may include all types of audio guidance output through a speaker, and otherwise restricted predetermined types of audio guidance (e.g., turn-by-turn voice navigation, alert sound for speed enforcement cameras, etc.).

Also, the information on a start and a termination of outputting audio guidance may be provided from an audio/video/navigation (AVN) system, but it is not limited thereto, so that there can be various variations according to the source of audio guidance.

The source of the information on a start and a termination of inputting voice command may be similar to the source of the information on a start and a termination of outputting audio guidance. For example, when a voice recognition function of the AVN system is activated according to a driver's manipulation of a voice recognition button on a steering wheel for inputting a voice command, a voice command input being started may be transmitted to the audio input/output supporting control unit 300. Also, when success or failure of recognizing a voice command is determined in the AVN system, or a driver terminates the voice recognition function, the AVN system may notify the audio input/output supporting control unit 300 of the termination of the voice command input. Of course, this is only an example and the present disclosure is not necessarily limited thereto.

The interior vehicle noise information may be provided through a speaker inside the vehicle and by reference to information of a predetermined table prepared according to the current operating point and speed gear in a powertrain.

The driver's requested torque (e.g., a torque value requested by the driver) may be obtained from an upper control unit controlling the powertrain (e.g., the hybrid control unit 240). The EV mode maximum torque may refer to the maximum torque of the motor 140 and may be obtained from the motor control unit 220 and/or the hybrid control unit 240.

Regarding the output information, the target drive mode may be information indicating one of an EV mode and an HEV mode. The EV line may be in a form of a requested torque which is a threshold for transition between the EV and HEV modes. For example, if a driver's requested torque does not go over the EV line during the EV mode, the EV mode may be maintained. Similarly, if the driver's requested torque exceeds the EV line during the EV mode, a mode transition to the HEV mode may be performed. If a hysteresis loop is applied for both the directions of the mode transition to reduce too often transitions, the EV line for the transition from EV mode to HEV may be distinguished, as HEV on line which is a threshold of the transition, from the EV line of HEV off line which is a threshold of the transition from HEV mode to EV, and the HEV on line may have higher values than the HEV off line without being limited thereto.

The above-described target drive mode and the EV line may be transmitted to the audio input/output supporting control unit 300.

When implemented, since the audio input/output supporting control unit 300 accompanies control of the powertrain (e.g., operating point control), it may be efficient for the control unit 300 to be implemented as a function of an upper control unit controlling overall the powertrain such as the hybrid control unit 240, but this is only example and the present disclosure is not limited thereto.

The audio input/output supporting control unit 300 is detailed below.

The audio input/output supporting control unit 300 may comprise a determining unit 310 and a controlling unit 320, and the determining unit 310 may comprise a control entry/termination determining unit 311 and the controlling unit 320 may comprise an EV mode controlling unit 321, a HEV mode controlling unit 322, and a control terminating unit 323.

At first, the control entry/termination determining unit 311 of the determining unit 310 may determine, based on the above described input information, an entry and a termination of a control for a noise reduction control of the powertrain to support audio input/output according to an embodiment.

For example, the control entry/termination determining unit 311 may determine whether a predetermined entry condition to be satisfied or not. For example, the entry condition may be satisfied in case where i) a predetermined type of audio guidance is started or the voice recognition function is activated on by a driver, ii) a level of interior vehicle noise is greater than a threshold noise level.

At the moment, the determining unit 310 may request an entry of EV mode control to the controlling unit 320 in case of the current drive mode being EV mode, and an entry of HEV mode control in case of the current drive mode being HEV mode. In here, the threshold noise level may be predetermined through tests to be a noise level at which voice recognition rate is below or equal to a specific value, but without being limited thereto.

The control entry/termination determining unit 311 may notify the controlling unit 320 a control termination in case where the above described entry condition is not satisfied or the audio guidance output or the voice command input is terminated.

Next, the controlling unit 320 is detailed.

In the EV mode controlling unit 321, a default EV line (or HEV on line) may be raised to prevent the engine from being started, in particular to prevent an entry into the HEV parallel mode. This will be described in reference to FIG. 4.

Figure 4:
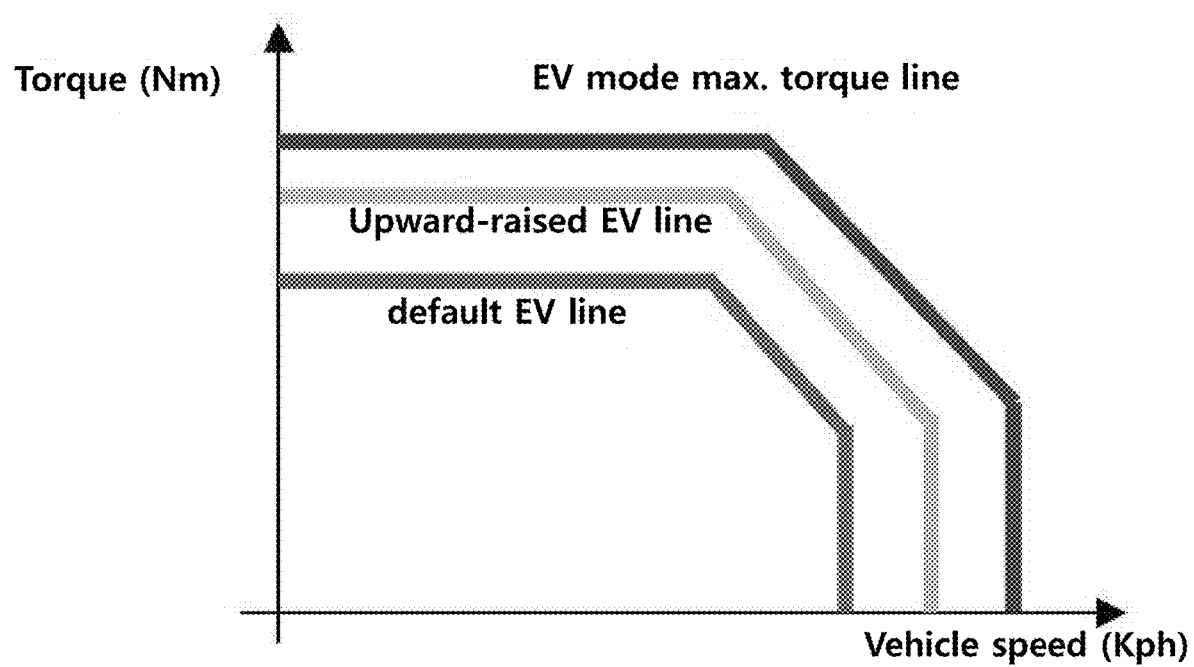
FIG. 4 represents an example of EV line being adjusted.

FIG. 4 represents an example of an EV line being adjusted according to an embodiment.

In reference to FIG. 4, the EV mode controlling unit 321 may adjust the predetermined default EV line to be a heightened EV line to support the audio input/output. The heightened EV line is preferred to be set lower than the EV mode maximum torque line, but without being limited thereto.

Also, the EV mode controlling unit 321 may inhibit the HEV series mode entries. The entry factors for the HEV series mode may comprise not only a need for the battery to be charged but also a need for air conditioning or catalyst heating of the engine 110.

The HEV mode controlling unit 322, during voice control, may control the drive mode to be changed to EV mode in case where a driver's request torque is below the EV mode maximum torque, and maintain the HEV mode of the current drive mode in case where the driver's request torque is greater that the EV mode maximum torque. In both the cases, the EV line (or HEV off line) may be raised (e.g., higher thresholds for vehicle speed and torque) to make the EV mode easier to enter. In here, a way of making a transition to the EV mode is setting the target drive mode as the output information to be EV mode, and an EV mode entry may be induced naturally by raising the EV line (e.g., higher thresholds for vehicle speed and torque).

The control terminating unit 323 may terminate the noise reduction control of the powertrain according to a notification of a control termination from the determining unit 310. In here, the termination of the noise reduction control of the powertrain may mean the powertrain following a default control with a driver's request torque (or request power), a battery state, a driving source state, etc. taken into consideration, without being limited thereto.

Figure 5:
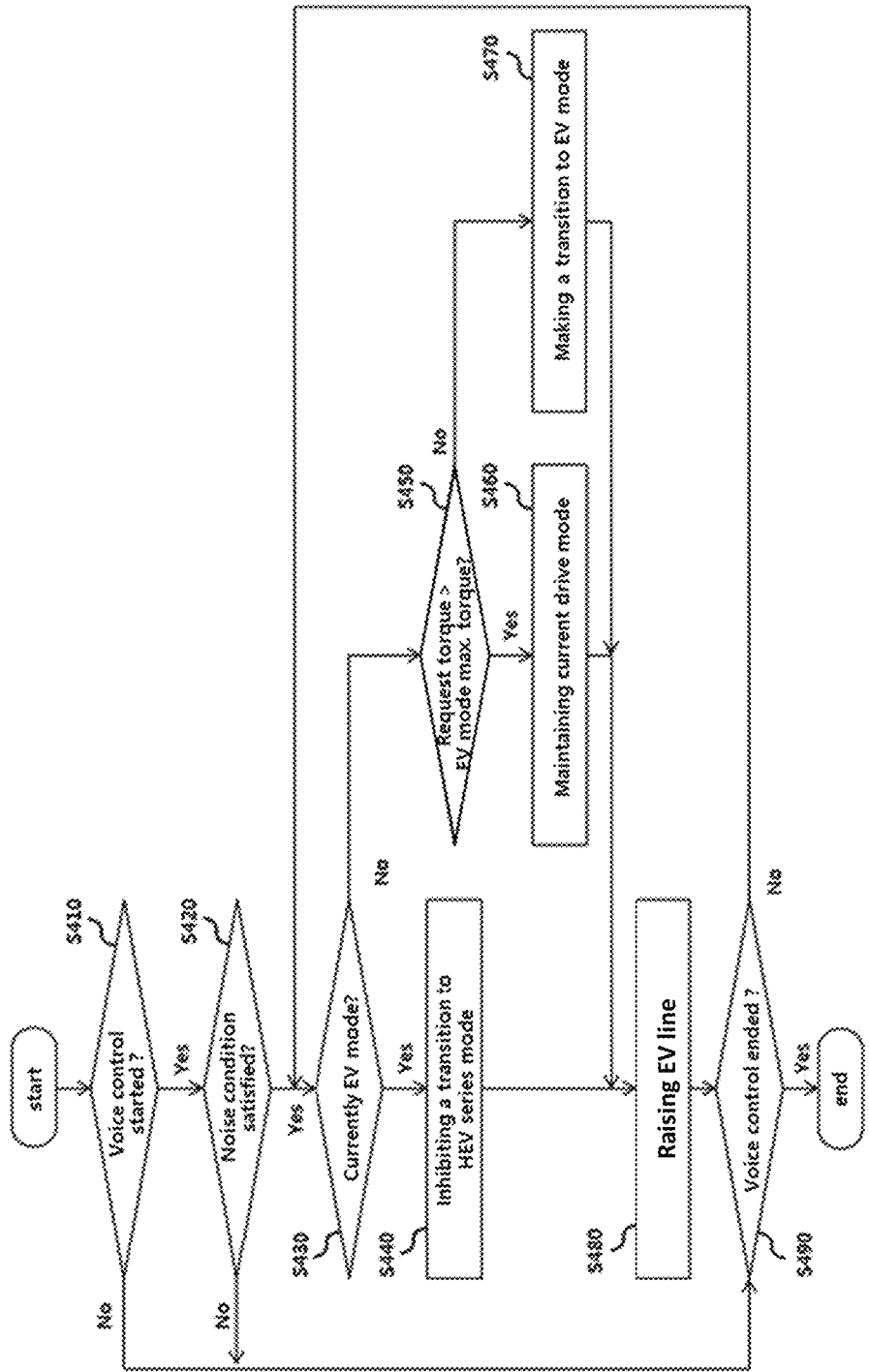
FIG. 5 represents an example of procedures for supporting audio input/output.

The above described procedures for the noise reduction control of a powertrain is represented by FIG. 5.

FIG. 5 represents an example of procedures for supporting audio input/output according to an embodiment.

In reference to FIG. 5, whether voice control to be started may be determined in the determining unit 310 of the audio input/output supporting control unit 300 (S410). The start of the voice control may mean a start of the audio guidance output or the voice command input set forth above in reference to FIG. 3.

Once the voice control has started (Yes in S410), the determining unit 310 may determine whether an interior vehicle noise level is greater than a threshold level (S420), and determine an entry into the control in case of the noise level being greater than the threshold level (Yes in S420).

Accordingly, the determining unit 310 may request an EV mode entry to the controlling unit 320 in case where a current drive mode is the EV mode, and, according to it, the determining unit 320 may inhibit a transition to the HEV series mode (S440) and raise (e.g., move up) the EV line (or HEV on line) (S480).

Otherwise, the determining unit 310 may request an HEV mode control entry to the controlling unit 320 in case where the current drive mode is the HEV mode (No in S430), and the controlling unit 320, accordingly, may determine to maintain the drive mode as the HEV mode (S460) in case where the driver's request torque is greater than the EV mode maximum torque (Yes in S450). If the driver's request torque is less than or equal to the EV mode maximum torque (No in S450), a transition to EV mode may be determined (S470). The controlling unit 320 may, while the voice control: is in operation, make a later entry of the EV mode easier (S480) by raising (e.g., moving up) the EV line (or HEV off line) even when the current drive mode is the HEV mode (No in S430).

The above described procedures up to the step S430 may be repeated until the voice control is terminated (S490).

On the other hand, according to another embodiment of the present disclosure, the determining unit 310 may determine the HEV mode control entry with further consideration of whether engine noise is the dominant source of the noise. The reason for further determining whether the engine noise is the dominant source of the noise is as follows.

Since operating noise of the engine 110 is generally greater than that of the motor 140, the drive mode control may attempt to reduce operation of the engine 110 as much as possible. For example, when the current drive mode is the EV mode, the controlling unit may attempt to maintain the EV mode for as long as possible, and conversely when the current drive mode is the HEV mode, the controlling unit may attempt to make a transition to the EV mode, so that the engine is prevented from being cranked. Accordingly, it is greatly effective particularly in a situation where interior vehicle noise can be reduced due to the engine 110 stopping from operation (e.g., when the operation noise of the engine 110 is the dominant source of the interior noise). On the contrary, if the noise is largely due to outside environmental noises rather than the engine operation noise, the overall interior noise level may not be reduced as much by stopping the engine 110. Audio input/output procedures is detailed in reference to FIG. 6.

Figure 6:
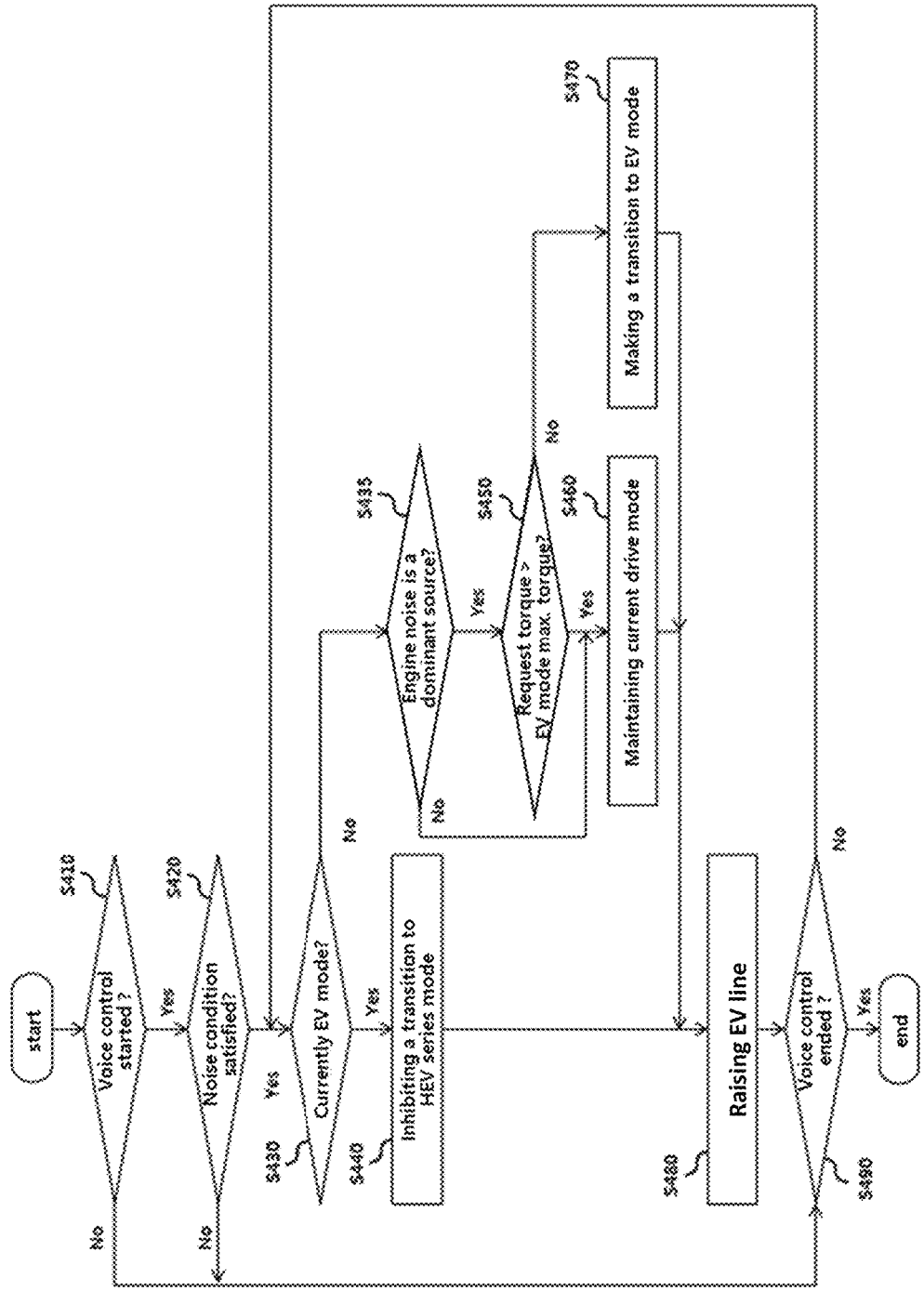
FIG. 6 represents an example of procedures for supporting audio input/output.

FIG. 6 represents an example of procedures for supporting audio input/output according to another embodiment.

The flow chart of FIG. 6 is similar to that of FIG. 5 except for the step S435 of determining whether engine noise is the dominant source of the noise, between the steps S430 and S450, therefore the repeated description is omitted.

In reference to FIG. 6, if a current drive mode is the HEV mode (No in S430), the determining unit 310 may determine whether engine noise is the dominant source of the noise (e.g., interior noise). When determining whether the engine noise is the dominant source of the noise, the determining unit 310 may compare the (overall) interior noise level with the level of the engine noise that is introduced inside (e. g., engine-induced interior noise level), and determine that the engine noise is not the dominant source if the interior noise level is greater than the engine noise level by at least a predetermined value amount. If the interior noise level is not greater than the engine noise level by at least the predetermined value amount, the engine noise may be determined to be the dominant source of noise. An engine-induced interior noise level may be determined with reference to a prepared table through tests (e. g., experiments) performed according to operating points of an engine. In other words, the determining unit 310 may obtain information on a current operating point of the engine from the engine control unit 210 or the hybrid control unit 240, and determine an engine-induced interior noise level inside the cabin by referring to the table for the operating point. This way of using a table is only an example without being limited thereto, and as far as it can determine an engine-induced interior noise level, the way is not limited.

If the engine noise is determined to be the dominant source of the noise (Yes in S435), a mode transition to the EV mode may be possible according to a comparison with a driver's request torque (S450), but otherwise (No in S435), the controlling unit 320 may maintain the current drive mode
(S460) since the effect of reduction in interior noise level resulted from the engine stopping may not be significant enough.

If the current drive mode is the HEV mode (No in S430), a forced transition to the EV mode (S470) or inducement of entry into the EV mode entry by raising the EV line (S480) may make a driver feel differently than usual. To this end, the HEV mode control unit 322 may control an output means so that information for notifying of HEV mode being performed is output. This is detailed with reference to FIG. 7.

Figure 7:
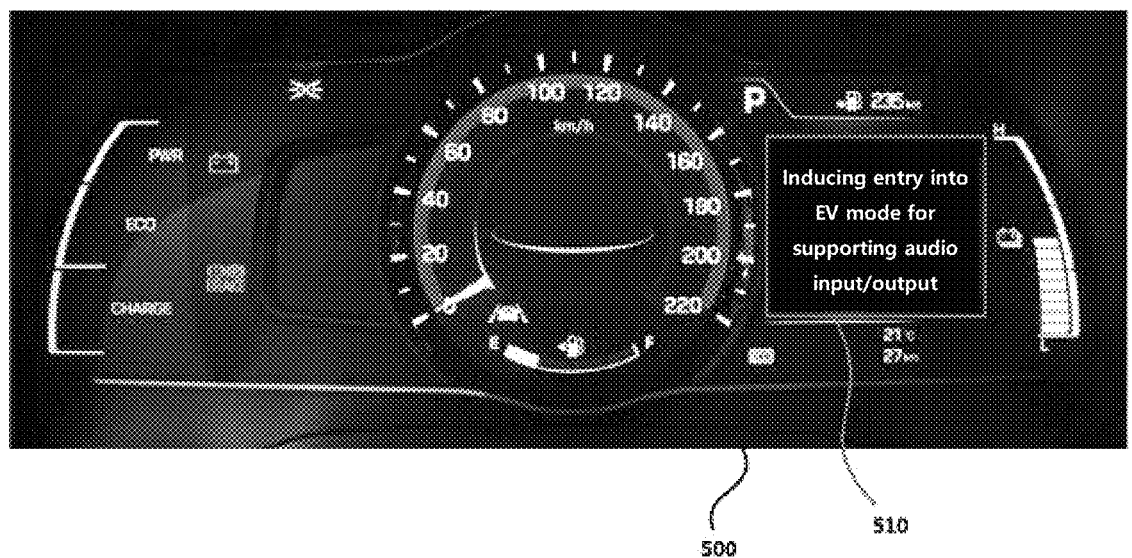
FIG. 7 represents an example of outputting information.

FIG. 7 represents an example of outputting information according to an embodiment of the present disclosure.

With reference to FIG. 7, the notifying information may be output through a display area 510, which is capable of displaying graphics in a cluster 500. This is only an example and the notifying information may be output in the form of a warning light (e.g., lamp) instead of graphics. Also, the area for displaying the notification information may be set on a heads-up display (HUD) or a head unit.

A method of supporting audio input/output for a hybrid electric vehicle according to an embodiment of the present disclosure comprises: determining a first condition for audio input/output function and a second condition for inside noise level; and performing a noise reduction control by inducing an engine-off state based on current drive mode in case where the first and the second conditions are satisfied.

For example, the first condition comprises at least one of a start of audio guidance output and a start of voice command input.

For example, the second condition comprises a case where the inside noise level is greater than a predetermined noise level.

For example, the performing of the noise reduction control, in case where the current drive mode is EV mode, comprises at least one of inhibiting a transition to HEV series mode and raising upward a threshold torque for a mode transition.

For example, the performing of the noise reduction control, in case where the current drive mode is HEV mode, comprises: maintaining the HEV mode in case where a driver's request torque is greater than an EV mode maximum torque; and making a transition to EV mode in case where the driver's request torque is below or equal to the EV mode maximum torque.

For example, the method further comprises raising upward a threshold torque for a mode transition.

For example, the performing of the noise reduction control, in case where the current drive mode is HEV mode, comprises determining whether engine noise is a dominant source for the inside noise.

For example, the performing of the noise reduction control further comprises making a transition to EV mode, in case where it is determined that the engine noise is the dominant source and a driver's request torque is below or equal to an EV mode maximum torque.

For example, the performing of the noise reduction control further comprises maintaining the HEV mode, in case where it is determined that the engine noise is the dominant source and the driver's request torque is greater than the EV mode maximum torque, or it is determined that the engine noise is not the dominant source.

For example, the determining of whether the engine noise is the dominant source comprises: substituting a current engine operating point into a table in which engine noise came inside is defined for each engine operating point; and comparing a result of the substituting and the inside noise level.

A hybrid electric vehicle according to an embodiment of the present disclosure comprises: an engine; a motor; and a control unit configured to determine whether a first condition for audio input/output function and a second condition for inside noise level are satisfied, and if the conditions are satisfied, perform a noise reduction control by inducing an engine-off state based on a current drive mode.

For example, the first condition comprises at least one of a start of audio guidance output and a start of voice command input.

For example, the second condition comprises a case where the inside noise level is greater than a predetermined noise level.

For example, in case where the current drive mode is EV mode, the control unit performs at least one of inhibiting a transition to HEV series mode and raising upward a threshold torque for a mode transition.

For example, in case where the current drive mode is HEV mode, the control unit controls to maintain the HEV mode in case where a driver's request torque is greater than an EV mode maximum torque, and make a transition to EV mode in case where the driver's request torque is below or equal to the EV mode maximum torque.

For example, the control unit raises upward a threshold torque for a mode transition in case where the first and the second conditions are satisfied.

For example, the control unit, in case where the current drive mode is HEV mode, determines whether engine noise is a dominant source for the inside noise.

For example, the control unit controls to make a transition to EV mode, in case where it is determined that the engine noise is the dominant source and a driver's request torque is below or equal to an EV mode maximum torque. For example, the control unit maintains the HEV mode, in case where it is determined that the engine noise is the dominant source and the driver's request torque is greater than the EV mode maximum torque, or it is determined that the engine noise is not the dominant source.

For example, the control unit substitutes a current engine operating point into a table in which engine noise came inside is defined for each engine operating point, and determines whether the engine noise is the dominant noise source by comparing a result of the substitution and the inside noise level.

Performance of voice recognition and audio guidance may be improved through a modification of a logic of a hybrid control unit without adding hardware, and thus the value of a vehicle may be increased. In addition, it is possible to convey clear information the driver while outputting important audio guidance.

On the other hand, the present disclosure described above may be embodied as computer-readable code on a medium in which a program is recorded. The computer-readable medium includes s all types of recording devices in which data readable by a computer system is stored. Examples of the computer-readable medium include a hard disk drive (HDD), a solid-state drive (SSD), a silicon disk drive (SDD), a read-only memory (ROM), a random-access memory (RAM), a compact disc read-only memory (CD-ROM), a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

What is claimed is:

1. A method comprising:
   determining, in a hybrid electric vehicle:
      a first condition for audio input or output function, wherein the first condition comprises at least one of a start of an audio guidance output or a start of a voice command input, and
      a second condition for an interior noise level, wherein the second condition comprises the interior noise level being greater than a noise level threshold; and
   performing, based on a determination that the first condition and the second condition are satisfied and further based on a current drive mode, a noise reduction control by inducing an engine-off state.

2. The method of claim 1, wherein the performing of the noise reduction control comprises, based on the current drive mode being an electric vehicle (EV) mode, at least one of inhibiting a transition to a hybrid electric vehicle (HEV) series mode, or raising a torque threshold for a mode transition.

3. The method of claim 1, wherein the performing of the noise reduction control comprises, based on the current drive mode being a hybrid electric vehicle (HEV) mode:
   maintaining the HEV mode based on a torque requested by a driver being greater than a maximum torque for an electric vehicle (EV) mode; and
   transitioning to the EV mode based on the torque requested by the driver being less than or equal to the maximum torque for the EV mode.

4. The method of claim 3, further comprising raising a torque threshold for a mode transition based on the first condition and the second condition being satisfied.

5. The method of claim 1, wherein the performing of the noise reduction control comprises, based on the current drive mode being a hybrid electric vehicle (HEV) mode, determining whether engine noise is a dominant source of interior noise.

6. The method of claim 5, wherein the performing of the noise reduction control further comprises transitioning to an electric vehicle (EV) mode, based on a determination that the engine noise is the dominant source of interior noise and a torque requested by a driver is less than or equal to a maximum torque for the EV mode.

7. The method of claim 5, wherein the performing of the noise reduction control further comprises maintaining the HEV mode, based on at least one of:
   a determination that the engine noise is the dominant source of interior noise and a torque requested by a driver is greater than a maximum torque for the EV mode, or
   a determination that the engine noise is not the dominant source of interior noise.

8. The method of claim 5, wherein the determining of whether the engine noise is the dominant source of interior noise comprises:
   access, using a current engine operating point, a table, which maps a plurality of engine operating points to respective engine-induced interior noise levels, to obtain an engine-induced interior noise level that corresponds to the current engine operating point; and
   comparing the engine-induced interior noise level with the interior noise level.

9. A hybrid electric vehicle comprising:
   an engine;
   a motor; and
   a controller configured to:
      determine whether a first condition for audio input or output function and a second condition for an interior noise level are satisfied, wherein the first condition comprises at least one of a start of an audio guidance output or a start of a voice command input, and wherein the second condition comprises the interior noise level being greater than a noise level threshold; and
      based on a determination that the first condition and the second condition are satisfied and further based on a current drive mode, perform a noise reduction control by inducing an engine-off state.

10. The hybrid electric vehicle of claim 9, wherein the controller is configured to, based on the current drive mode being an electric vehicle (EV) mode, perform at least one of inhibiting a transition to a hybrid electric vehicle (HEV) series mode, or raising a torque threshold for a mode transition.

11. The hybrid electric vehicle of claim 9, wherein the controller is configured to, based on the current drive mode being a hybrid electric vehicle (HEV) mode:

maintain the HEV mode based on a torque requested by a driver being greater than a maximum torque for an electric vehicle (EV) mode; and cause a transition to the EV mode based on the torque requested by the driver being less than or equal to the maximum torque for the EV mode.

12. The hybrid electric vehicle of claim 11, wherein the controller is further configured to raise a torque threshold for a mode transition based on the first condition and the second condition being satisfied.

13. The hybrid electric vehicle of claim 9, wherein the controller is configured to, based on the current drive mode being a hybrid electric vehicle (HEV) mode, determine whether engine noise is a dominant source of interior noise.

14. The hybrid electric vehicle of claim 13, wherein the controller is configured to cause a transition to an electric vehicle (EV) mode, based on a determination that the engine noise is the dominant source of interior noise and a torque requested by a driver is less than or equal to a maximum torque for the EV mode.

15. The hybrid electric vehicle of claim 13, wherein the controller is configured to maintain the HEV mode, based on at least one of:
   a determination that the engine noise is the dominant source of interior noise and a torque requested by a driver is greater than the maximum torque for the EV mode, or
   a determination that the engine noise is not the dominant source of interior noise.

16. The hybrid electric vehicle of claim 13, wherein the controller is configured to determine whether the engine noise is the dominant source of interior noise by:
   access, using a current engine operating point, a table, which maps a plurality of engine operating points to respective engine-induced interior noise levels, to obtain an engine-induced interior noise level that corresponds to the current engine operating point; and
   comparing the engine-induced interior noise level with the interior noise level.

* * * * *